(12) United States Patent
Bioret

(10) Patent No.: US 12,063,908 B2
(45) Date of Patent: Aug. 20, 2024

(54) FLOORING, IN PARTICULAR FOR THE FLOOR OF AN ENCLOSURE FOR RAISING ANIMALS

(71) Applicant: BIORET AGRI-LOGETTE CONFORT, Nort sur Erdre (FR)

(72) Inventor: Jean-Vincent Bioret, Petit Mars (FR)

(73) Assignee: BIORET AGRI-LOGETTE CONFORT, Nort sur Erdre (FR)

( * ) Notice: Subject to any disclaimer, the term of this patent is extended or adjusted under 35 U.S.C. 154(b) by 847 days.

(21) Appl. No.: 16/982,895

(22) PCT Filed: Feb. 20, 2019

(86) PCT No.: PCT/FR2019/050387
§ 371 (c)(1),
(2) Date: Sep. 21, 2020

(87) PCT Pub. No.: WO2019/162614
PCT Pub. Date: Aug. 29, 2019

(65) Prior Publication Data
US 2021/0000064 A1 Jan. 7, 2021

(30) Foreign Application Priority Data
Feb. 20, 2018 (FR) ...................................... 1851440

(51) Int. Cl.
*A01K 1/01* (2006.01)
*A01K 1/015* (2006.01)

(52) U.S. Cl.
CPC .......... *A01K 1/0103* (2013.01); *A01K 1/0151* (2013.01)

(58) Field of Classification Search
CPC ............................ A01K 1/0103; A01K 1/0151
See application file for complete search history.

(56) References Cited

U.S. PATENT DOCUMENTS 3,528,391 A * 9/1970 Johnson ............... A01K 1/0151
256/17
3,680,530 A * 8/1972 Drawsky .............. A01K 1/0151
119/529
(Continued)

FOREIGN PATENT DOCUMENTS

AT 301137 8/1972
NL 1039330 7/2013

OTHER PUBLICATIONS

Translation of "System for Collecting Dejections Flowing on the Floor of an Enclosure for Raising Animals"; Bioret Jean-Vincent; WO 2016128684 A1 (Year: 2016).*

(Continued)

*Primary Examiner* — Monica L Perry
*Assistant Examiner* — Brittany A Lowery
(74) *Attorney, Agent, or Firm* — NIXON & VANDERHYE

(57) ABSTRACT

Disclosed is a flooring, in particular for an enclosure for raising animals. This flooring includes side members which are made of a resilient material and which are intended to be juxtaposed in order to form a support surface. The side members include recesses suitable for engaging with spacers which are added in order to stabilize the juxtaposed side members at a fixed spacing. And the attachment portions of the spacers and the recesses of two juxtaposed side members are designed in order to conserve a space, advantageously a groove opening upwards, between the side faces of the juxtaposed side members.

14 Claims, 4 Drawing Sheets

(56) References Cited

U.S. PATENT DOCUMENTS

| | | | | | |
|---|---|---|---|---|---|
| 3,716,027 | A | * | 2/1973 | Vickstrom | E04B 5/10 52/669 |
| 3,757,743 | A | * | 9/1973 | Lehe | A01K 1/0151 119/529 |
| 4,135,339 | A | * | 1/1979 | Pawlitschek | A01K 1/0151 119/508 |
| 4,184,303 | A | * | 1/1980 | Hassman | E04B 5/026 52/762 |
| 4,231,325 | A | * | 11/1980 | Parks | A01K 1/0151 52/660 |
| 5,351,458 | A | * | 10/1994 | Lehe | A01K 1/015 52/177 |
| 5,486,392 | A | * | 1/1996 | Green | A47L 23/26 52/177 |
| 5,553,427 | A | * | 9/1996 | Andres | E04B 5/12 52/480 |
| 6,233,886 | B1 | * | 5/2001 | Andres | E04F 15/10 52/489.1 |
| 6,594,961 | B2 | * | 7/2003 | Leines | E01C 5/20 52/177 |
| 10,674,701 | B2 | * | 6/2020 | Kramer | A01K 1/0103 |
| 2015/0059271 | A1 | * | 3/2015 | Tsai | E04F 15/02194 52/302.1 |

OTHER PUBLICATIONS

International Search Report for PCT/FR2019/050387, mailed May 16, 2019, 5 pages.
Written Opinion of the ISA for PCT/FR2019/050387 with translation, mailed May 16, 2019, 15 pages.

* cited by examiner

FLOORING, IN PARTICULAR FOR THE FLOOR OF AN ENCLOSURE FOR RAISING ANIMALS

This application is the U.S. national phase of International Application No. PCT/FR2019/050387 filed 20 Feb. 2019, which designated the U.S. and claims priority to FR Patent Application No. 1851440 filed 20 Feb. 2018, the entire contents of each of which are hereby incorporated by reference.

TECHNICAL FIELD TO WHICH THE INVENTION RELATES

The present invention generally relates to the field of floorings, in particular for the ground of an enclosure for livestock (for example, cattle).

In particular, it relates to the floorings suitable for equipping the circulation corridors of such a livestock enclosure.

TECHNOLOGICAL BACK-GROUND

Animal comfort is a determining parameter in the livestock efficiency, which influences in particular the animal health, the way they eat, as well as their fertility and longevity.

This animal comfort is regulated in particular by legal obligations that are defined in the Treaties of Amsterdam (1999) and Lisbon (2009) relating to the Protocol on Protection and Welfare of Animals, as well as the adoption of the second European Animal Welfare Strategy.

In stable, this comfort involves in particular a rapid and efficient disposal of the excreta produced by the animals.

This excreta management must indeed make it possible to reduce the gas emanations and the proliferation of bacteria in the livestock enclosure, and hence to improve the ambient conditions and the sanitary performances.

These excreta are moreover liable to make the ground slippery, with the risks of fall and injuries that ensue therefrom.

Several excreta disposal systems coexist today: the mechanical disposal systems, the "flush" systems, and the duckboard systems.

Within the framework of a "mechanical disposal" solution, the excreta present on the ground are scraped off one to several times per day by a so-called scraping device called a "planer" (operated by a tractor or by automatic means), to be brought to a collection pit located out of the livestock building.

However, the separation of urines and faeces is not optimum in such a disposal system, which hence constitutes an important source of ammonia. Moreover, the installation of such a disposal system involves significant structural works, which are difficult to envisage in an existing livestock enclosure.

With a "flush", a flushing liquid vigorously disposes of the excreta to a gutter then to an external pit.

Now, here again, the separation of urines and faeces is not optimum in such a disposal system, still constituting an important source of ammonia. Moreover, the implementation of such a system leads to a significant moistening of the livestock enclosure grounds, which is liable to generate problems of grip and hygiene.

More generally, an excessively wet flooring is liable to cause sanitary problems at the animal feet, in particular lameness, which constitutes a major livestock health problem Among the infections at the origin of lameness, digital dermatitis, also called "Mortellaro disease", is the most problematic.

There hence still exists a need for technical solutions making it possible to reduce moisture of the livestock enclosure ground bearing surfaces by an efficient disposal of the liquids (in particular, urines), advantageously without requiring for that purpose significant structural works, so as to improve the grip conditions and the sanitary conditions of the animals.

There also exists an interest for simple solutions that potentially permit a certain separation of urines and faeces, so as to limit the production of ammonia in the livestock enclosures.

OBJECT OF THE INVENTION

In this context, the applicant has developed a new flooring structure aiming at improving the hygiene conditions in a livestock enclosure, in particular thanks to an optimum management of the liquids.

The flooring according to the invention comprises for that purpose stringers that are made of at least one elastic material and that are intended to be juxtaposed in order to form a bearing surface.

The stringers each have a set of faces:
  two front faces, one intended to rest on a receiving surface and the other intended to form a bearing portion of said bearing surface, and
  two lateral faces, at least one of which is intended to come opposite the lateral face of a juxtaposed stringer.

According to the invention, the stringers include recesses adapted to cooperate with spacers that are added to stabilize the juxtaposed stringers with a fixed spacing.

The spacers each include:
  attachment portions, adapted to enter said recesses of two juxtaposed stringers, and
  a link portion, connecting the attachment portions.

And the attachment portions of said spacers and the recesses of two juxtaposed stringers are arranged so as to maintain a space, advantageously a groove opening upward, between the lateral faces of the juxtaposed stringers.

Preferably, for that purpose, the spacing between said attachment portions is greater than the spacing between the recesses of two adjoining stringers, to maintain a space, advantageously a groove opening upward, between the lateral faces of the juxtaposed stringers.

The flooring according to the invention, intended to equip an enclosure for livestock, is adapted to form a bearing surface on which the animals are intended to rest; and this bearing surface is intended to be divided into a plurality of bearing portions (each formed by a stringer), which are separated from each other by grooves (space between two juxtaposed stringers) intended to receive the liquids flowing on said flooring.

Such a structure allows an automatic and continuous disposal of the liquids from said bearing portions, up to the grooves.

The bearing surfaces of the flooring hence remain permanently relatively little wet, hence participating in improving the quality characteristics of the ground as regards grip and hygiene.

This structure also permits a rapid and relatively efficient separation of urines with respect to faeces, to limit the production of ammonia in a livestock enclosure.

Such a flooring according to the invention is moreover adapted to be installed in a simple way in a new or an existing livestock enclosure (improvement or renovation), without requiring for that purpose the implementation of significant structural works.

The less wet environment also allows the bovine hoof to be harder, which participates to the foot health of these animals and contributes to reduce the risks of animal slides.

According to a preferred embodiment, the recesses are formed on at least a first one of said front faces of said stringers, and each extend along said lateral faces of said stringers.

Non-limitative and advantageous characteristics of this embodiment, taken individually or according to all the technically possible combinations, are the following:

at least one of the stringers comprises at least two longitudinal channels forming said recesses; the longitudinal channels advantageously have the following dimensions: a width comprised between 2 and 10 mm, and a depth comprised between 8 and 28 mm;

said at least one stringer includes at least one lateral lip that, on the one hand, delimits said at least one channel and, on the other hand, forms the lateral face of said stringer; said lateral lip including a free edge offset with respect to said first front face, on the side of the second front face, for example by a distance comprised between 1 mm and 5 mm; said lateral lip having for example a thickness comprised between 5 and 20 mm.

According to still another particular embodiment, the spacers consist of parts that are made, for example, of plastic material.

The spacers have advantageously a U-shaped cross-section, with:

two outer flaps forming the attachment portions, advantageously provided with hooking ribs, and a bottom flap forming the link portion.

At least one of the profiles advantageously has two inner flaps, remote from each other, and outer flaps; said inner flaps being advantageously intended to each bear on a lateral face of an associated stringer.

The inner flaps are advantageously connected by a transverse flap, opposite to and remote from the bottom flap. This transverse flap is advantageously continuous, or discontinuous, to form at least one aperture.

As an alternative, the bottom flap includes at least one inclined segment, whose slope is directed in the spacer length direction.

Generally, the stringers advantageously have the following dimensions:

a width comprised between 150 and 400 mm, and a height comprised between 15 and 40 mm.

The invention also proposes a system for collecting the excreta flowing on the ground of an enclosure for livestock, for example cattle, said system comprising:

a flooring according to the invention, and means for conveying the excreta within said grooves, so as to generate a circulation of said excreta along said grooves and towards collection means.

The invention also proposes a livestock enclosure equipped with a flooring according to the invention, or even with a system for collecting excreta according to the invention.

The livestock enclosure advantageously includes a circulation corridor having a longitudinal axis and covered with a flooring. The stringers of said flooring are arranged parallel, or at least approximately parallel, to said longitudinal axis.

The stringers are installed with the first one of said front faces resting on the receiving surface, so that the stringers are placed on the spacers.

The present invention also relates to the stringer for a flooring, in particular for the ground of an enclosure for livestock (for example, cattle).

Said stringer is made of at least one elastic material and is intended to be juxtaposed to another stringer to form a bearing surface.

This stringer has a set of faces:

two front faces, one intended to rest on a receiving surface and the other intended to form a bearing portion of said bearing surface, and two lateral faces, at least one of which is intended to come opposite the lateral face of a juxtaposed stringer.

Said stringer includes recesses adapted to cooperate with spacers that are added to stabilize the juxtaposed stringers with a fixed spacing.

DETAILED DESCRIPTION OF AN EXEMPLARY EMBODIMENT

The following description in relation with the appended drawings, given by way of non-limitative example, will allow a good understanding of what the invention consists of and of how it can be implemented.

FLOORING

Figure 1:
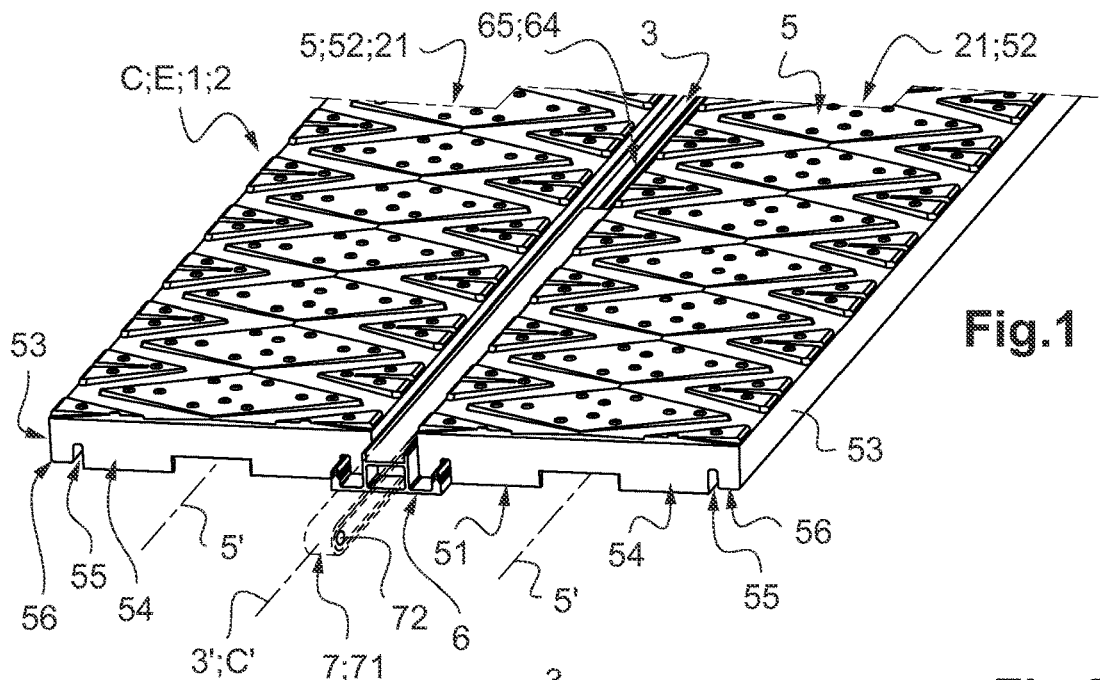
FIG. 1 is a partial perspective view of the flooring according to the invention.

The flooring 1 according to the invention, schematically and partially shown in FIG. 1, is particularly adapted to equip the ground of an enclosure E for livestock.

By "animals", it is meant in particular cattle (especially, dairy cattle or beef cattle), pigs, or any other livestock animal (sheep, poultry, rabbits, horses, etc.).

Such a livestock enclosure (not shown) consists of a building delimited by a frame, adapted for the desired livestock (for example, a stable in case of cattle).

A part at least of the ground of this livestock enclosure E is covered with the flooring 1 according to the invention.

In particular, the flooring 1 is advantageously implanted at the circulation corridors C that are taken by the animals travelling between the different functional spaces of the livestock enclosure E (for example, stalls, milking parlours, etc.).

And this flooring 1 is adapted to collect the liquids flowing on the ground and to dispose them of, so as to provide a relatively dry (or at least without excessive moisture), and hence healthier, bearing surface for the feet of the animals.

For that purpose, and as illustrated in FIG. 1, this flooring 1 comprises a bearing surface 2, on which the animals are intended to rest and which is divided into a plurality of bearing portions 21, separated from each other by grooves 3.

The bearing portions 21 of the bearing surface 2 extend between two grooves 3, and advantageously in a same plane, or at least approximately in a same plane.

The space between two bearing portions 21 forms one of these grooves 3 opening upward.

The grooves 3 hence constitute structures such as troughs or gutters, opening upward, through the bearing surface 2.

These grooves 3 are adapted to collect (by gravity), or even contain, the liquids flowing on the flooring 1, so that these liquids stagnate the less possible on the bearing portions 21.

By "liquids", it is meant in particular the liquid excreta produced by the animals of the livestock, in particular the urine thereof.

Generally, as described hereinafter in relation with FIGS. 2 and 3, each groove 3 is delimited by two lateral faces 31 connected by a bottom face 32.

These grooves 3 have advantageously particular dimensions to allow an efficient collection of the liquids, while avoiding hampering the travel of the animals.

Figure 3:
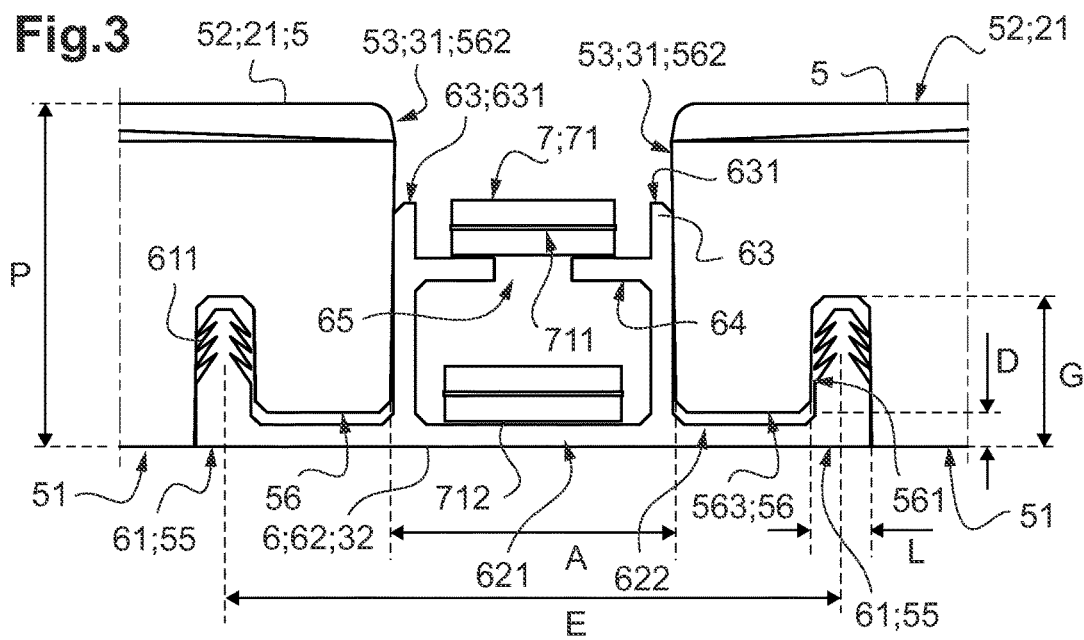
FIG. 3 is a partial and enlarged view of the flooring according to FIG. 2, showing in more detail the vertical cross-section of a spacer of the profile-type having two inner flaps connected by a transverse flap provided with at least one longitudinal aperture.

For that purpose, as illustrated in FIG. 3, each groove 3 can be defined by two dimensions: a width A (distance separating its two opposite lateral faces 31), and a depth P (maximum distance separating its bottom face 31 and the adjacent bearing portions 21).

Herein, the grooves 3 each advantageously have:
a width A of at most 50 mm, preferably comprised between 15 and 50 mm, and
a depth P of at least 15 mm, advantageously comprised between 15 and 50 mm.

The grooves 3 are advantageously regularly spaced apart with respect to each other on the flooring 1.

In other words, these grooves 3 are advantageously regularly distributed over the flooring 1.

For that purpose, the flooring 1 herein comprises:
stringers 5, intended to be juxtaposed to form the bearing portions 21 of the bearing surface 2, and
spacers 6 added to stabilize the juxtaposed stringers 5 with a fixed spacing/separation (with a determined space), so as to define the grooves 3 between the juxtaposed stringers (in other words, the stringers 5 are not adjoining/adjacent).

Stringers

The stringers 5 can consist of beams, as shown in FIGS. 1 to 6. As an alternative, these stringers 5 can also consist of carpet-shaped parts.

The stringers 5 are made of at least one elastic material, advantageously adapted to undergo a squeezing deformation, by at least 1 mm, and preferably comprised between 1 and 5 mm, when an animal or a person foot bears on it.

By "squeezing", it is meant in particular a reduction of the thickness of the stringer 5.

For that purpose, said at least one material adapted to undergo an elastic deformation is chosen among:
the elastomeric materials, i.e. for example the natural rubber, the "synthetic natural" rubber (or synthetic poly-isoprene), the polybutadiene or the styrene-budatiene, or
the plastic or thermoplastic elastomeric (TPE) materials, i.e. for example PVB (polyvinyl butyral), ABS (acrylonitrile butadiene styrene)/SBR (styrene-butadiene), PP (polypropylene)/EPDM (ethylene-propylene-diene monomer), TPU (TPE polyurethane).

These stringers may be made single-material or multimaterial.

More precisely, these stringers 5 have advantageously a generally parallelepipedal shape. They hence each have a set of longitudinal faces (FIGS. 1 and 2):
two front faces 51, 52, a lower one and an upper one,
two longitudinal, lateral faces 53, advantageously parallel to each other, and
two transverse, end faces 54, advantageously parallel to each other.

The front faces 51, 52 advantageously consist of:
a first, lower, front face 51, intended to rest on a receiving surface (for example, a concrete slab or a duckboard), and
a second, upper, front face 52, intended to form one of the bearing portions 21 of the bearing surface 2.

The second, upper, front face 52 preferably consists of a horizontal planar surface or a convex curved surface.

For an optimum adhesion, the second front face 52 is advantageously provided with anti-skid protrusions.

The anti-skid protrusion consists for example of a single-piece protrusion chosen among the protrusions used in the floorings conventionally implemented in the livestock buildings, for example diamond-shaped protruding elements provided with bosses.

The second front face 52 also advantageously includes a layer of abrasive material, in order to allow and/or favour the wearing of the hooves and the animal foot health.

To obtain this layer of abrasive material, the abrasive material is advantageously mixed with the constituent material of the stringer 5.

The abrasive material consists for example of particles of quartz, metal or any other material having an abrasive power on the cow hoof.

This abrasive material is added before, during or after the manufacturing of the stringer 5.

The vertical lateral faces 53 are for their part intended to come opposite the lateral face 53 of a juxtaposed stringer 5.

The stringers 5 have advantageously the following dimensions:
a width (distance between the lateral faces 53) comprised between 100 and 500 mm, preferably between 150 and 400 mm, and
a height (distance between the front faces 51, 52) comprised between 15 and 40 mm.

According to the invention, the stringers 5 have recesses 55 adapted to cooperate with spacers 6 that are added to stabilize the juxtaposed stringers 5 with a fixed spacing.

The recesses 55 are herein formed in the first front face 51 of the stringers 5. These recesses 55 hence open on the side of this first front face 51.

These recesses 55 advantageously each extend along (near) the lateral faces 53 of the stringers 5.

Herein, each stringer 5 comprises at least two longitudinal channel 55 forming said recesses, each extending along one of its two lateral faces 53.

In other words, each lateral face 53 of the stringer 5 is lined with at least one longitudinal channel 55 (a continuous longitudinal channel or a discontinuous longitudinal channel) forming a housing.

The longitudinal channels 55 advantageously have the following dimensions (FIG. 3):
- a width L comprised between 2 and 10 mm (distance measured parallel to the front faces 51, 52), and
- a depth G comprised between 8 and 28 mm (distance measured parallel to the lateral faces 53).

This stringer 5 herein comprises two lateral lips 56 that, on the one hand, delimits an above-mentioned groove 55, and on the other hand, forms one of the lateral faces 53 of this stringer 5.

For that purpose, this lateral lip 56 comprises the following faces:
- an inner lateral face 561, delimiting the groove 55,
- an outer lateral face 562, forming one of the lateral faces 53 of the stringer 5, and
- a free edge 563, extending on the side of the first (lower) front face 51.

The thickness of the lateral lip 56 corresponds to the distance between its two lateral faces 561, 562. This thickness is for example comprised between 5 and 20 mm.

The free edge 563 is offset with respect to the first (lower) front face 51, on the side of the second (upper) front face 52. This offset is useful to take into account the positioning and the bulk of the spacers 6.

The offset of this free edge 563, with respect to the first (lower) front face 51, is for example comprised between 1 mm and 15 mm.

Generally, the stringers 5, before their installation, can advantageously be stored flat or as rolls.

This latter roll embodiment has for interest to allow a simple and rapid installation of the stringers 5 in the livestock enclosure by unwinding; it also allows ensuring an optimum continuity of the grooves 3 for the efficient recovery of the liquids at the ends of these latter.

Spacers

The flooring 1 also comprises the spacers 6, described in detail hereinafter in relation in particular with FIG. 3.

Each spacer 6 comprises:
- attachment portions 61, adapted to enter the recesses 55 of two juxtaposed stringers 5, and
- a link portion 62, connecting these attachment portions 61.

The attachment portions 61 are spaced apart by a spacing E that is herein defined by the link portion 62.

The attachment portions 61 of the spacers 6 and the recesses 55 of the two juxtaposed stringers 5 are arranged so as to maintain a space 3, advantageously a groove 3 opening upward, between the lateral faces 53 of the juxtaposed stringers 5.

For that purpose, the spacing E between the attachment portions 61 is advantageously greater than the spacing between the recesses 55 of two adjoining stringers 5 (configuration not shown), to maintain a space/spacing (forming a groove 3) between the lateral faces 53 of the juxtaposed stringers 5.

By "adjoining stringers 5", it is meant two stringers 5 whose opposite lateral faces 53 would bear (in other words, be in contact) against each other.

The "interspace", maintained between the lateral faces 53 of the two juxtaposed stringers 5, forms a groove 3 intended to receive the liquids flowing on the bearing surface 2.

In the present case, the spacers 6 here consist of parts (denoted by the same reference 6) that are made, for example, of plastic material. In the present description, the words "spacer", "part" and "profile" are used indifferently.

The spacers 6 are, for example, made of a material chosen among acrylonitrile butadiene styrene (ABS), polyethylene (PE), polyamide (PA), polypropylene (PP), polyvinyl chloride (PVC) or any other mixed plastic material (including the recycled plastic materials).

These spacers 6 may be manufactured by an extrusion technique or a plastic injection technique.

Generally, the profiles 6 have a U-shaped cross-section, with:
- two (vertical) outer flaps 61, forming the attachment portions 61, and
- one (horizontal) bottom flap 62, forming the link portion 62 and herein forming a bottom face of a groove 3.

The outer flaps 61 advantageously extend, on the one hand, parallel to each other and, on the other hand, perpendicular to the bottom flap 62.

The outer flaps 61 are advantageously provided with hooking ribs 611, to favour the hooking of these outer flaps 61 within the recesses 55.

These hooking ribs 611 are directed so as to favour the squeezing while increasing the separation/extraction force.

The profile 6 herein also comprises two inner flaps 63 that are advantageously intended to each bear on a lateral face 53 of an associated stringer 5.

The two inner flaps 63 form, with the adjacent lateral faces 53, the two lateral faces 31 of a groove 3.

The two inner flaps 63 extend from the bottom flap 62, between the two outer flaps 61.

The inner flaps 63 extend remote from each other and from the outer flaps 61.

The inner flaps 63 also advantageously extend, on the one hand, parallel to each other and to the outer flaps 61, and on the other hand, perpendicular with respect to the bottom flap 62.

The inner flaps 63 and the central strip 621 of the bottom flap 62 (between the two inner flaps 63) are advantageously continuous. These flaps 62, 63 hence advantageously form a liquid-tight structure, adapted to serve as a trough for the collection and the travel of the liquids.

Moreover, the spacing between the two inner flaps 63 advantageously corresponds, at least approximately, to the width A of the groove 3.

Likewise, an inner flap 63 and the opposite outer flap 61 form, with a lateral strip 622 of the bottom flap 62, a U-shaped groove opening at the opposite of the bottom flap 62 to receive (to within the clearance) an above-mentioned lateral lip 56.

To ensure improved tightness and holding, the spacing between an inner flap 63 and the opposite outer flap 61 advantageously correspond to the thickness of the above-mentioned lateral lip 56 (distance between its two lateral faces 561, 562).

Moreover, the inner flaps 63 advantageously have a height higher than that of the outer flaps 61.

On this matter, the outer flaps 61 have for example a height lower than, or equal to, the depth of the longitudinal channels 55. The inner flaps 63 have themselves a height lower than, or equal to, the height of the stringers 5; in particular, the inner flaps 63 advantageously have a height going from a minimum height corresponding to half the height of the stringers 5, to a maximum height corresponding to the height of the stringers 5.

Figure 2:
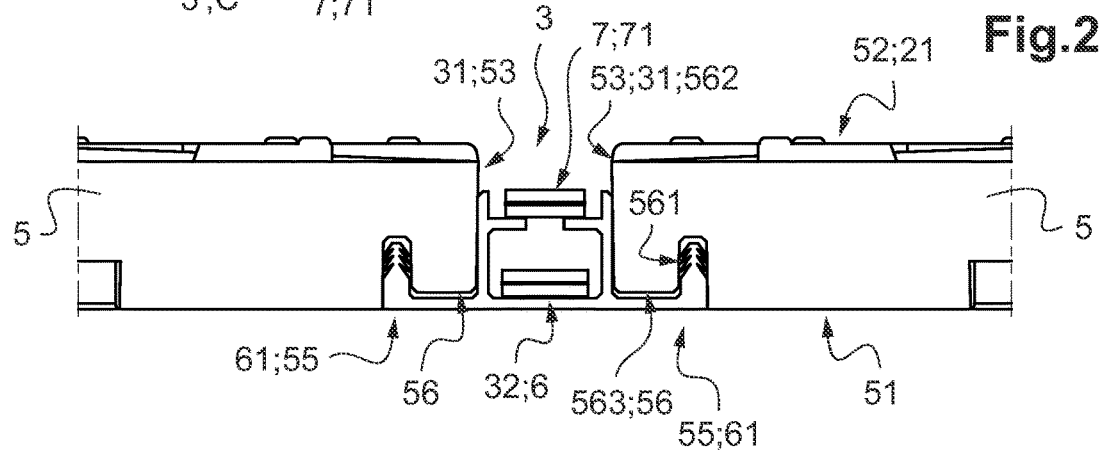
FIG. 2 is a cross-sectional and partial view of the flooring according to FIG. 1, with a vertical and transverse cross-sectional plane.

In addition, as illustrated in FIGS. 1 to 3, the inner flaps 63 can carry a transverse flap 64, opposite et remote from the bottom flap 62 (and in particular its central strip 621).

Herein, this transverse flap 64 is located between the bottom flap 62 and the free end 631 of the inner flaps 63 (FIG. 3).

The profile 6 hence comprises a longitudinal chamber delimited by the central strip 621 of the bottom wall 62, by the two inner flaps 63 and by the transverse flap 64.

The transverse flap 64 can be discontinuous, to form at least one elongated through-aperture 65.

The transverse flap 64 can hence include a continuous aperture or a discontinuous aperture (several successive apertures).

Such an embodiment is interesting to optimize the separation of wastes:
the potential solid wastes will remain above this transverse flap 64, and
the liquid wastes will pass through said at least one aperture 65, so as to come between the transverse flap 64 and the bottom flap 62.

Figure 4:
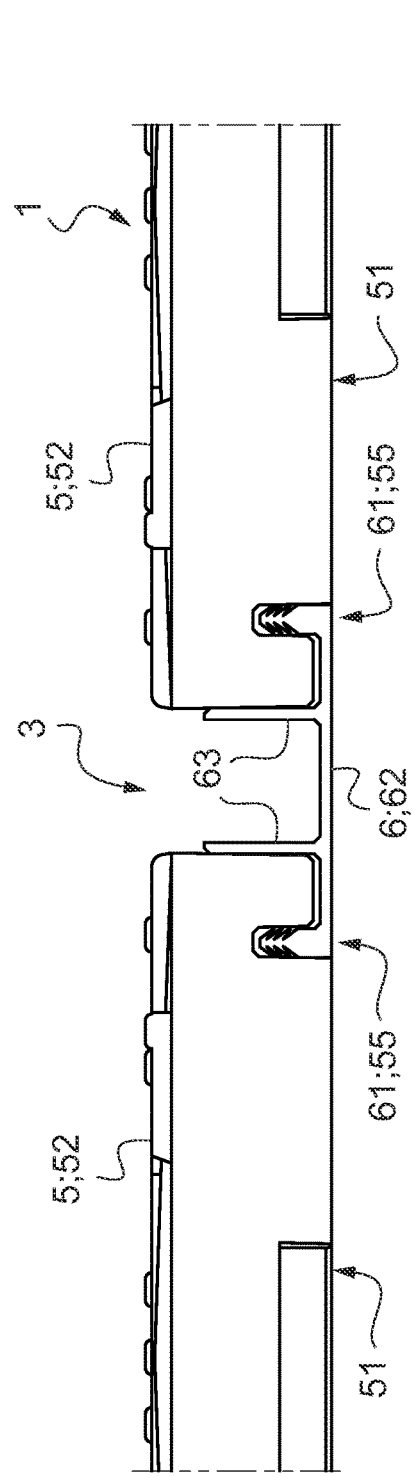
FIG. 4 is a partial and enlarged view of another flooring according to the invention, showing in more detail the vertical cross-section of a spacer of the profile-type having two inner flaps devoid of the transverse flap.

As an alternative, as illustrated in FIG. 4, the profile 6 includes the outer flaps 61 and the inner flaps 63 that are carried by the bottom flap 62.

On the other hand, this profile 6 is devoid of the transverse flap 64. The inner flaps 63 hence form, with a central strip 621 of the bottom flap 62, a channel corresponding to the groove 3 intended to receive the liquids.

Figure 5:
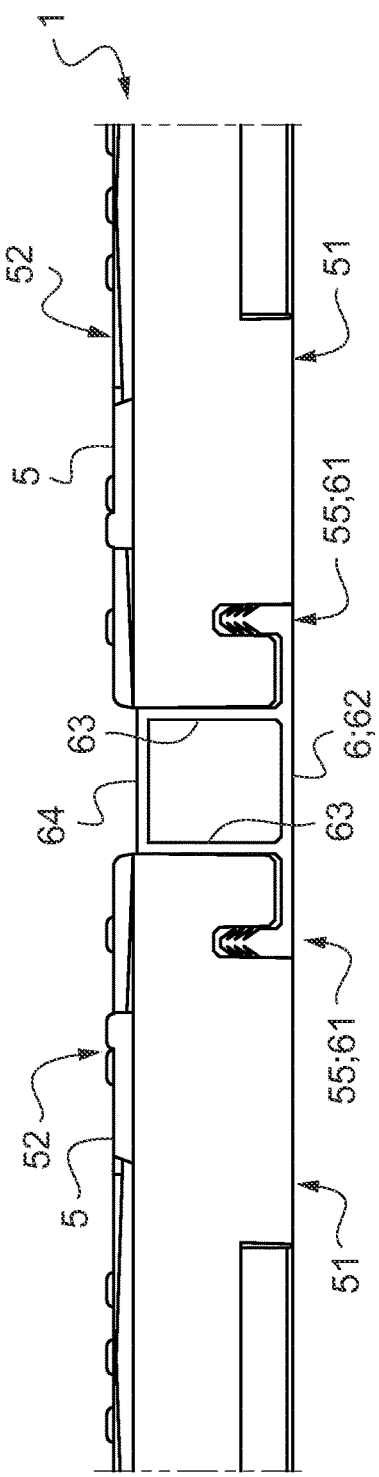
FIG. 5 is a partial and enlarged view of another flooring, showing in more detail the vertical cross-section of a spacer of the profile-type having two inner flaps connected with a continuous transverse flap that is directed upward.
Figure 6:
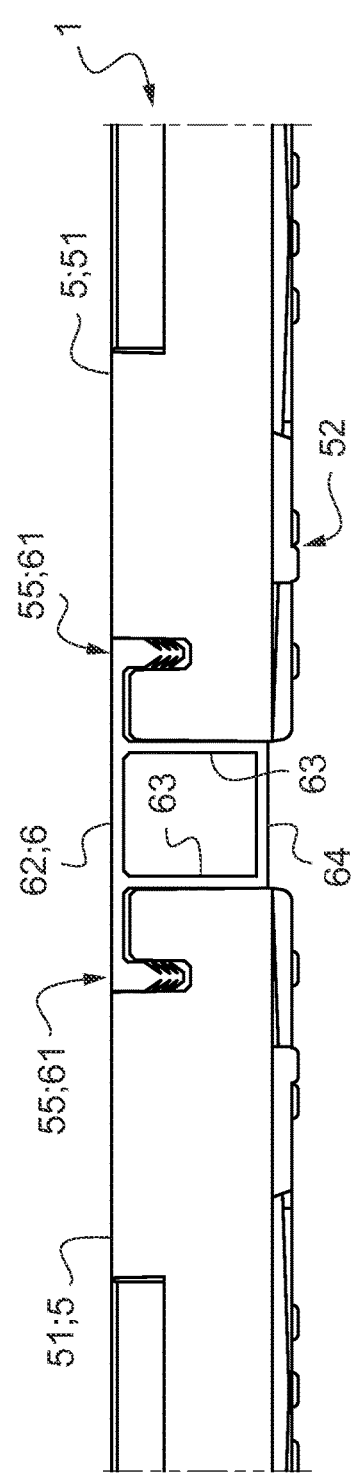
FIG. 6 is a partial and enlarged view of another flooring, showing in more detail the vertical cross-section of a spacer of the profile-type having two inner flaps connected with a continuous transverse flap that is directed downward.
Figure 7:
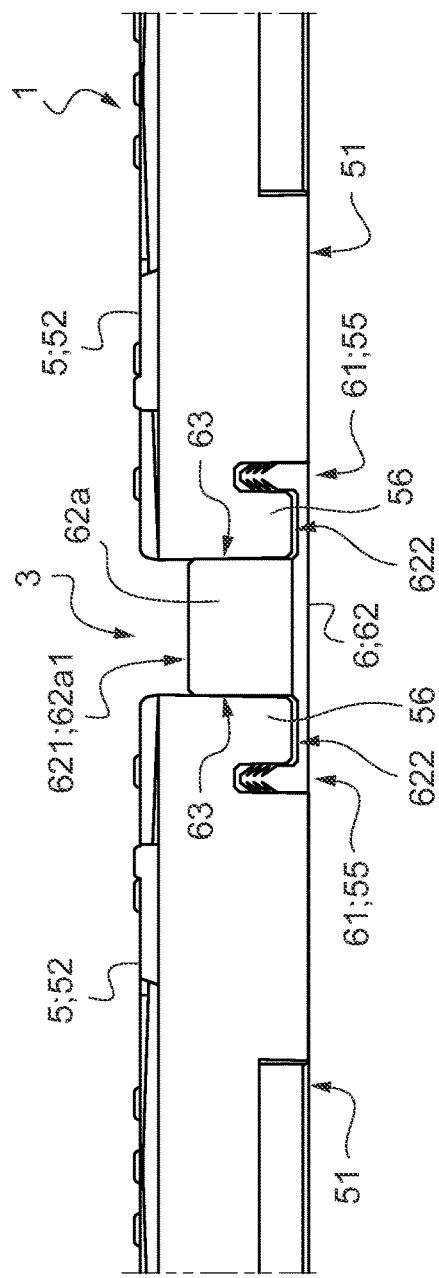
FIG. 7 is a cross-sectional and partial view of the flooring according to the invention, with a vertical and transverse cross-sectional plane, the spacer of which comprises a dihedral bottom flap.

According to an alternative embodiment illustrated in FIGS. 5 and 6, the inner flaps 63 carry a transverse flap 64, opposite and remote from the bottom flap 62.

The inner flaps 63 advantageously have a height equal to the height of the stringers 5.

The transverse flap 64 is continuous. It advantageously extends in the plane, or at least approximately in the plane, of an opposed front face 51, 52.

As another alternative, the profile 6 comprises only the bottom flap 62 carrying the outer flaps 61 (without the inner flaps 63).

Collecting System

According to an embodiment shown in FIGS. 1 to 3, the flooring 1 can equip a system for collection excreta flowing on the ground of an enclosure for livestock.

In this context, this system advantageously comprises:
a flooring 1 according to the invention (as described in FIGS. 1 to 4), and
means 7 for conveying the excreta within the grooves 3, so as to generate an excreta circulation along said grooves 3 and towards collection means (not shown).

The collection means comprise in particular a pit (or a recovery channel), installed at at least one open end of the grooves 3 of the flooring 1.

These collection means can also comprise ducts for the liquid disposal.

The ducts open, on an upstream side, into the grooves 3 and, on a downstream side, opposite the orifices of a duckboard.

To generate an optimum circulation of the liquid excreta towards these collection means (and possibly the solid excreta), the collection system according to the invention also comprises the means 7 for conveying the liquids (and potentially solid excreta) along the grooves 3 of the flooring 1.

Herein, these conveying means 7 comprise for that purpose driving members 71 that are placed in the grooves 3 and that are coupled with operating means 72 (FIG. 1) to apply them a movement intended to cause the excreta displacement in a suitable direction within these grooves 3.

The driving members 71 advantageously consist of endless strips or belts, that are placed into and along the grooves 3 and the profiles 6.

These driving members 71 are shown partially and schematically in FIGS. 1 to 3 for the sake of simplification. However, in practice, these driving members 71 are advantageously intended to extend over the whole length of the associated profiles 6.

These driving members 71 advantageously comprise conveying surfaces forming kind of planers or scrapers, adapted to push/repel/pull the excreta present within the associated profiles 6.

Preferably, these driving members 71 are made single-piece, in an elastomeric material, i.e. for example the natural rubber, the "synthetic natural" rubber (or synthetic poly-isoprene), the polybutadiene or the styrene-budatiene.

This material of the driving members 71 helps in limiting the frictions with the profiles 6.

The operating means 72 ensure an operation in translation of the driving members 71 within their respective profiles 6, so as to generate a circulation of the excreta within these associated profiles 6.

During this translation operation, the friction forces are advantageously reduced in particular due to the properties of the profiles 6.

For example, the operating means 72 advantageously comprise a set of pulleys cooperating with the driving members 71.

According to an embodiment shown in FIGS. 1 to 3, the pulleys 71 are arranged so that the driving members 71 form a roundtrip within a single and same groove 3 and its associated profile 6.

In this embodiment, the driving member 71 advantageously comprises two superimposed active strands in the profile 6 (FIG. 3):
an upper strand 711 travelling above the transverse flap 64, forming an upper portion adapted to serve as a support to the solid excreta, while allowing the flowing of the liquid excreta, and
a lower strand 712 travelling under the transverse flap 64, forming a lower portion adapted to convey the liquid excreta travelling from said upper portion 711.

Such an embodiment aims at favouring a disposal, on the one hand, of the solid excreta at a first end of the groove 3, and on the other hand, liquid excreta at a second end of the groove 3.

According to another embodiment, the pulleys 72 are arranged so that the driving members 71 form together a roundtrip assembly in the successive profiles 6 so as to have a generally S-shape (viewed from above).

In the different embodiments, one at least of the pulleys 72 is motorized to ensure the travel of the driving members 71.

The traveling speed is for example comprised between 1 and 10 m/min, in particular according to the concentration of animals per $m^2$ and the type of excreta.

Two successive active strands 71 hence travel in reverse directions with respect to each other.

Livestock Enclosure

In practice, as shown in FIGS. 1 to 5, the stringers 5 are installed with the first front face 51 resting on the receiving surface.

The stringers 5 are placed on the spacers 6, which are also installed on the side of the receiving surface.

In particular, the attachment portions 61 of the spacers 6 are fitted into the dedicated recesses 55 of the stringers 5. As the case may be, the bottom flap 62 of the profiles 6 bears on the ground, in the continuation of the first front faces 51 of the stringers 5.

Generally, the stringers 5 and the spacers 6 of the profile type are advantageously staggered: the profiles 6 connect edge to edge the stringers 5 arranged in series.

The stringers 5 are then stabilized by the spacers 6, so that the grooves 3 open upward in order to receive the liquid by gravity.

These grooves 3 are advantageously rectilinear and extend parallel to each other.

Each groove 3 hence comprises a longitudinal axis 3', extending parallel to its lateral faces 31; the longitudinal axes 3' of the different grooves 3 extend parallel to each other.

Preferably, the grooves 3 are distributed over the width of the flooring 1; and these groves 3 extend over the whole length of the flooring 1.

The grooves 3 hence delimit between each other a plurality of bearing portions 21 that each have the shape of a rectilinear strip.

Each stringer 5 has a longitudinal axis 5', extending parallel to the longitudinal axis 3' of the grooves 3 and the longitudinal axis 5' of the other stringers 5.

Still preferably, the livestock enclosure E comprises a circulation corridor C having a longitudinal axis C' and covered with the flooring 1.

And the stringers 5 of this flooring 1 are arranged parallel, or at least approximately parallel, with respect to this longitudinal axis C' of the circulation corridor C.

This arrangement is in particular useful to favour the disposal of the liquids contained in the grooves 3 up to the collection means equipping the livestock enclosure and that are implanted at the end of the circulation corridors C.

In operation, the flooring 1 is liable to receive different organic matters, in particular excreta (urine, faeces).

The flooring 1 then allows a flowing of the liquids between the stringers 5, up to the grooves 3, hence avoiding the accumulation of these liquids on the stringers 5 that hence remain relatively dry.

The solid matters, in particular the faeces, remain mainly on the stringers 5, so as to avoid the mixing thereof and to limit the production of ammonia within the livestock enclosure.

These solid matters are advantageously disposed of by scrapping of the stringers 5, by means of a scrapping system potentially chosen among the usual systems.

During a cleaning of this flooring 1, the cleaning liquid will also flow into these grooves 3, avoiding that the stringers 5 remain excessively wet.

This phenomenon hence allows the animals to travel on a relatively healthy bearing surface 2, with a reduced risk of fall and without moistening of their feet.

Generally, the flooring 1 according to the invention hence allows a rapid and continuous disposal of the liquids with respect to the bearing surface 2, which allows an efficient holding of the latter in the dry state (or at least without excess of moisture), hence limiting the problems of hygiene met with the usual floorings.

The flooring 1 according to the invention hence allows a certain separation of the liquids that flow in the grooves 3, with respect to the faeces that mainly remain on the stringers 5, so as to avoid their mixing and to limit the production of ammonia in the livestock enclosure.

Variant Embodiment

According to still another variant embodiment illustrated in FIG. 5, the flooring 1 comprises a profile 6 that is provided with a continuous transverse flap 64.

This transverse flap 64 advantageously extends in the plane, or at least approximately in the plane, of the second front face 52.

The flooring 1 will then have a continuous bearing surface 2.

According to a variant of installation illustrated in FIG. 6, the first front face 51 provided with recesses 55 is directed upward.

The spacers 6 are then placed on the stringers 5, so that their bottom flaps 62 form a portion of the bearing surface 2 between two stringers 5.

The transverse flap 64 advantageously extends in the plane, or at least approximately in the plane, of the second (herein lower) front face 52.

Here again, the flooring 1 will comprise a continuous bearing surface 2.

According to still another variant embodiment illustrated in FIGS. 7 to 10, the flooring 1 comprises a spacer 6 having a U-shaped cross-section, with:

two (vertical) outer flaps 61, forming the attachment portions 61, and an inclined bottom flap 62 (in particular, an inclined central strip 621), forming the link portion 62 and forming the bottom face of a groove 3.

Here again, the outer flaps 61 are advantageously provided with hooking ribs 611, to favour the hooking of these outer flaps 61 within the recesses 55.

The bottom flap 62 itself includes at least one inclined segment 62a, advantageously at the level of the central strip 621 and interposed between the lateral strips 622.

By "inclined segment", it is meant in particular a portion of surface that is advantageously planar and that is intended to form a slope with respect to the horizontal and advantageously with respect to the lateral strips 622 (advantageously intended to bear on the ground, horizontally).

Figure 9:
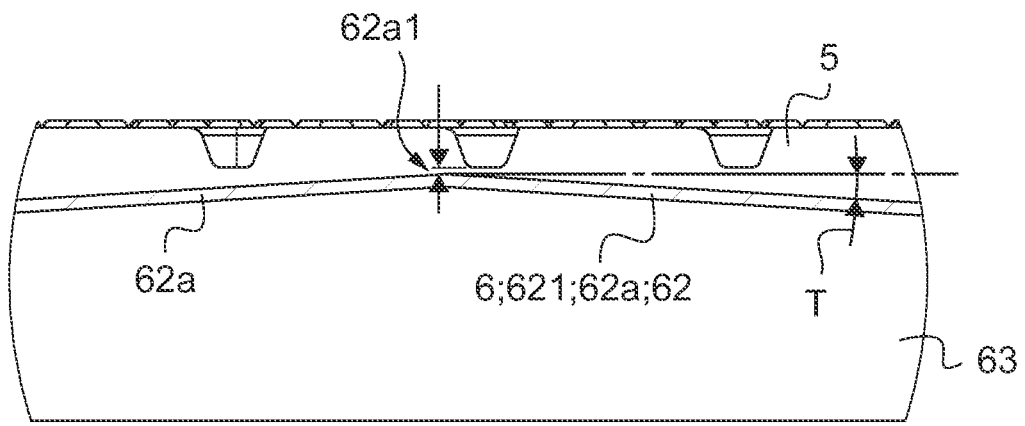
FIG. 9 shows, in an isolated and enlarged view, the detail IX of FIG. 8 that shows a portion of the bottom flap (the edge from which extend the two inclined segments)
Figure 10:
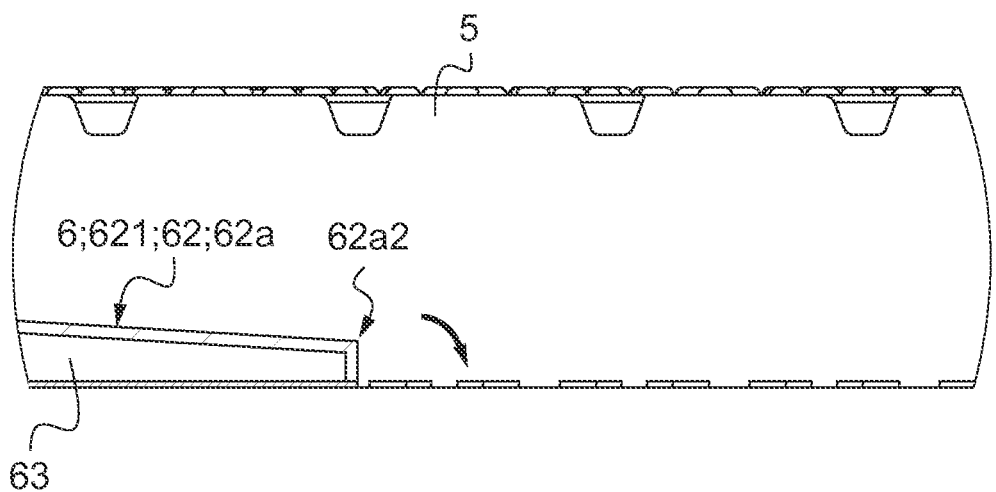
FIG. 10 shows, in an isolated and enlarged view, the detail X of FIG. 8 that illustrates the lower end of one of the inclined segments.

Each inclined segment 62a hence comprises a downward slope delimited by two ends, i.e. a slope extending from an upper end 62a1 (FIG. 9) to a lower end 62a2 (FIG. 10).

In other words, each inclined segment 62a is arranged so that:

its upper end 62a1 is located remote from the first, lower front face 51, and remote from the lateral strips 622, and the lower end 62a2 is located near this same first, lower front face 51, and near these lateral strips 622.

In other words, the downward slope is directed longitudinally, in the direction of the length of the spacer 6.

The lower end 62a1 of the inclined segment 62a opens (ends) at one of the ends of the spacer 6.

Such an inclined segment 62a is hence intended to ensure a flowing of the liquids in a direction from its upper end 62a1 to its lower end 62a2, until their flowing at this lower end 62a2 (as illustrated by the arrow F shown in FIG. 10).

Figure 8:
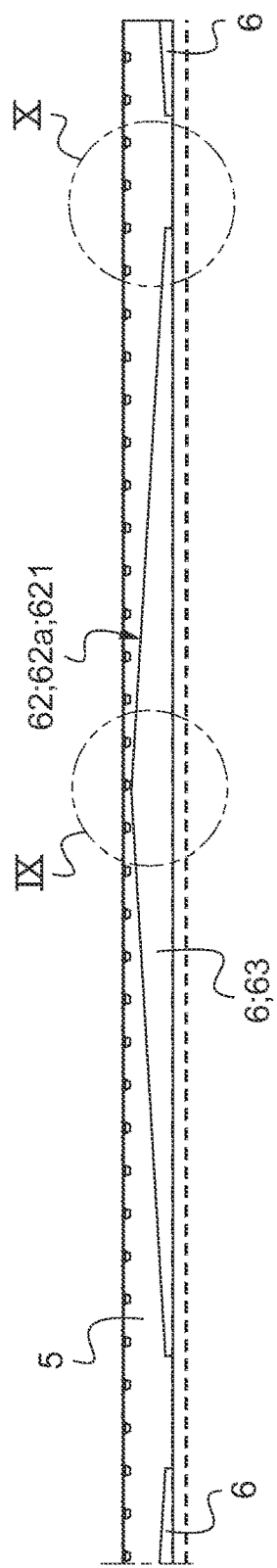
FIG. 8 is a cross-sectional view of the flooring according to FIG. 7, according to a longitudinal cross-sectional plane arranged along the spacer.

A space is then maintained between two successive spacers 6 to form an aperture allowing the flowing of the liquids (FIG. 8).

Herein, the bottom flap 62 comprises two inclined segments 62a, defining together a generally dihedral shape.

This bottom flap 62 comprises two inclined segments 62a that extend divergently with respect to each other from a common upper end 62a1.

Likewise, the inclined segments 62a comprise the following dimensions, alone or in combination:
- the inclined segments 62a have together a length from 0.3 and 2 m, also corresponding to the length of the spacer 6,
- the length of each inclined segment 62a corresponds to half the above-mentioned length, respectively from 0.15 to 1 m.

The apertures between two spacers 6 have advantageously a length comprised between 50 and 500 mm.

Moreover, the inclined segments 62a advantageously have a slope T from 2% to 7% (FIG. 9).

The inclined segments 62a are also laterally ended by the two inner flaps 63 that are advantageously intended to each bear on a lateral face 53 of an associated stringer 5.

Each inner flap 63 is hence connected, on the one hand, to the central strip 621, at the upper edge thereof, and on the other hand, at the lateral strip 622, at the lower edge thereof.

In other words, here again, an inner flap 63 and the opposite outer flap 61 form, with a lateral strip 622 of the bottom flap 62, a U-shaped groove to receive (to within the clearance) an above-mentioned lateral lip 56.

Hence, to ensure improved tightness and holding, the spacing between an inner flap 63 and the opposite outer flap 61 advantageously corresponds to the thickness of the above-mentioned lateral lip 56 (distance between its two lateral faces 561, 562).

Such a spacer 6 according to FIGS. 7 to 10 is advantageously made by an injection moulding method (also called "plastic injection method").

In practice, in this embodiment according to FIGS. 7 to 10 and within the grooves 3, the liquids will travel along inclined segments 62a, in the direction of the slope, so as to be led to the apertures between two spacers 6.

The liquids will then be able to circulate by gravity to, and through, the ground S formed, as the case may be, by a duckboard openwork floor.

The solid matters, in particular the faces, mainly remain on the stringers 5, so as to avoid their mixing with the liquids and to limit the production of ammonia in the livestock enclosure.

According to still another variant, not shown, the spacers 6 are chosen with a spacing E of the attachment portions 61 that is identical to the spacing of the recesses 55 of the two stringers 5 whose lateral faces 53 are adjoining.

The flooring 1 would then comprise stringers 5 that are adjoining (the lateral faces 53 bearing against each other) to form a continuous bearing surface 2.

The invention claimed is:

1. Flooring configured for a ground of an enclosure for livestock, said flooring comprising:
   a plurality of spacers consisting of plastic parts; and
   a plurality of stringers that are made of at least one elastic material and that are configured to be juxtaposed in order to form a bearing surface, said stringers each having a generally parallelepipedal shape, each of the stringers having
     a set of faces including:
       two front faces, one of the front faces being configured to rest on a bearing surface, the other of the front faces being configured to form a bearing portion of said bearing surface, and
       two lateral faces, at least one of the lateral faces being configured to come opposite the lateral face of a juxtaposed stringer, and
     a plurality of recesses configured to cooperate with the spacers that are added to stabilize the juxtaposed stringers with a fixed spacing, and
   wherein said spacers each include:
     a plurality of attachment portions configured to enter said recesses of two juxtaposed stringers, the attachment portions of the spacers and the recesses of two juxtaposed stringers are configured to maintain a groove opening upward between the lateral faces of the juxtaposed stringers, and
     a link portion connecting the attachment portions,
   wherein the spacers have a U-shaped cross-section with:
     two outer flaps forming the attachment portions provided with hooking ribs, and
     a bottom flap forming the link portion,
   wherein at least one of the spacers include
     two inner flaps, remote from each other, the inner flaps being configured to bear on the lateral face of an associated one of the stringers, said bottom flap having a central strip between said two inner flaps, and
     said outer flaps,
   wherein the inner flaps of at least one of the spacers and the central strip of the bottom flap of said spacers are continuous so that the inner flaps of at least one of the spacers and the bottom flap of the spacers form a liquid-tight structure configured to serve as a trough for collection and travel of the liquids.

2. The flooring according to claim 1, wherein said recesses are formed on at least a first one of said front faces of said stringers, each of the recesses extending along said lateral faces of said stringers.

3. The flooring according to claim 2, wherein the recesses comprise at least two longitudinal channels.

4. The flooring according to claim 3, wherein said at least one stringer includes at least one lateral lip that delimits said at least one longitudinal channel and forms the lateral face of said stringer, said at least one lateral lip including a free edge offset with respect to a first front face, on the side of a second front face.

5. The flooring according to claim 1, wherein the inner flaps are connected by a transverse flap, opposite and remote from the bottom flap,
   said transverse flap being continuous, or discontinuous, to form at least one aperture.

6. The flooring according to claim 1, wherein the bottom flap includes at least one inclined segment, the slope of the inclined segment being in the direction of a spacer length.

7. A system for collecting excreta flowing on a ground of an enclosure for livestock, said system comprising:
   the flooring according to claim 1; and
   a conveying system configured to convey the excreta within the grooves of the flooring to generate a circulation of said excreta along said grooves toward a collector that is a pit or a recovery channel installed at at least one open end of the grooves of the flooring, the conveying system comprising driving members disposed in the grooves and coupled with an operating system configured to apply the driving members with movement to cause the excreta displacement in a direction within the grooves, the driving members consisting of endless strips or belts disposed in and along the grooves and the spacers.

8. A livestock enclosure equipped with the flooring according to claim 1.

9. The livestock enclosure according to claim 8, wherein the stringers are installed with a first one of said front faces resting on the bearing surface, so that the stringers are placed on the spacers to maintain a plurality of grooves between the lateral faces of the juxtaposed stringers.

10. A system for collecting excreta flowing on a ground of an enclosure for livestock, said system comprising:
the flooring according to claim 2; and
a conveying system configured to convey the excreta within the grooves of the flooring to generate a circulation of said excreta along said grooves toward a collector that is a pit or a recovery channel installed at least one open end of the grooves of the flooring, the conveying system comprising driving members disposed in the grooves and coupled with an operating system configured to apply the driving members with movement to cause the excreta displacement in a direction within the grooves, the driving members consisting of endless strips or belts disposed in and along the grooves and the spacers.

11. A system for collecting excreta flowing on a ground of an enclosure for livestock, said system comprising:
the flooring according to claim 3; and
a conveying system configured to convey the excreta within the grooves of the flooring to generate a circulation of said excreta along said grooves toward a collector that is a pit or a recovery channel installed at least one open end of the grooves of the flooring, the conveying system comprising driving members disposed in the grooves and coupled with an operating system configured to apply the driving members with movement to cause the excreta displacement in a direction within the grooves, the driving members consisting of endless strips or belts disposed in and along the grooves and the spacers.

12. A system for collecting excreta flowing on a ground of an enclosure for livestock, said system comprising:
the flooring according to claim 4; and
a conveying system configured to convey the excreta within the grooves of the flooring to generate a circulation of said excreta along said grooves toward a collector that is a pit or a recovery channel installed at least one open end of the grooves of the flooring, the conveying system comprising driving members disposed in the grooves and coupled with an operating system configured to apply the driving members with movement to cause the excreta displacement in a direction within the grooves, the driving members consisting of endless strips or belts disposed in and along the grooves and the spacers.

13. The flooring according to claim 1, wherein the inner flaps carry a transverse flap, opposite and remote from the bottom flap,
wherein the transverse flap is one of: (i) continuous, and (ii) discontinuous, to form at least one elongated through-aperture.

14. A system for collecting excreta flowing on a ground of an enclosure for livestock, said system comprising:
the flooring according to claim 2; and
a conveying system configured to convey the excreta within the grooves of the flooring to generate a circulation of said excreta along said grooves and toward a collector that is a pit or a recovery channel installed at least one open end of the grooves of the flooring,
wherein the inner flaps carry a transverse flap, opposite and remote from the bottom flap,
wherein the transverse flap is discontinuous, to form at least one elongated through-aperture,
the conveying system comprising driving members disposed in the grooves and coupled with an operating system configured to apply the driving members with movement to cause the excreta displacement in a direction within the grooves, the driving members consisting of endless strips or belts disposed in and along the grooves and the spacers, the driving members consisting of endless strips or belts disposed in and along the grooves and the spacers, the driving members each comprising two superimposed active strands in the spacer including
an upper strand traveling above the transverse flap, forming an upper portion configured to serve as a support to the solid excreta, while allowing the flowing of the liquid excreta, and
a lower strand traveling under the transverse flap, forming a lower portion configured to convey the liquid excreta traveling from said upper portion.

* * * * *